US008708704B2

(12) United States Patent
Bielenberg et al.

(10) Patent No.: US 8,708,704 B2
(45) Date of Patent: Apr. 29, 2014

(54) SYSTEM FOR PROVIDING ROADMAPS FOR BUILDING PROFICIENCIES IN SKILL AREAS

(75) Inventors: Daniel R. Bielenberg, Geneva, IL (US);
Maeve Lucas, South Elgin, IL (US);
Barbara J. Bartilson, Aurora, IL (US);
Jasmine Cugini, Austin, TX (US);
Robert S. Gerard, Geneva, IL (US);
Bryan McCart, Saint Charles, IL (US);
Michael Gombar, Elburn, IL (US);
William A. Jindrich, Aurora, IL (US);
Samir A. Desai, Rolling Meadows, IL (US)

(73) Assignee: Accenture Global Services Limited, Dublin (IE)

( * ) Notice: Subject to any disclaimer, the term of this patent is extended or adjusted under 35 U.S.C. 154(b) by 1260 days.

(21) Appl. No.: 12/551,218

(22) Filed: Aug. 31, 2009

(65) Prior Publication Data

US 2011/0053126 A1    Mar. 3, 2011

(51) Int. Cl.
*G09B 11/00* (2006.01)
*G06Q 10/00* (2012.01)

(52) U.S. Cl.
USPC .......................................... 434/219; 705/7.42

(58) Field of Classification Search
USPC ........................................ 434/219, 236, 350
See application file for complete search history.

(56) References Cited

U.S. PATENT DOCUMENTS

| 6,157,808 | A  | * | 12/2000 | Hollingsworth ............. 434/350 |
| 6,301,462 | B1 |   | 10/2001 | Freeman et al. |
| 6,398,556 | B1 | * | 6/2002  | Ho et al. .................... 434/219 |
| 2002/0077884 | A1 |   | 6/2002 | Sketch |
| 2003/0129575 | A1 |   | 7/2003 | L'Allier et al. |
| 2003/0175676 | A1 | * | 9/2003 | Theilmann et al. ........... 434/350 |
| 2003/0182178 | A1 |   | 9/2003 | D'Elena et al. |
| 2005/0095569 | A1 |   | 5/2005 | Franklin |

OTHER PUBLICATIONS

Examiner's Second Report issued on Jul. 19, 2011, for related Australian patent application No. 2010203294.
Examiner's Third Report issued on Nov. 17, 2011, for related Australian patent application No. 2010203294.
Examiner's First Report issued on Mar. 1, 2011, for related Australian patent application No. 2010203294.
Examiner's Fourth Report issued on Apr. 23, 2012, for related Australian patent application No. 2010203294.
Examiner's Fifth Report issued on Oct. 30, 2012, for related Australian patent application No. 2010203294.

* cited by examiner

*Primary Examiner* — Kathleen Mosser
(74) *Attorney, Agent, or Firm* — Brinks Hofer Gilson & Lione

(57) ABSTRACT

A system is described for providing roadmaps for building proficiencies in skill areas. The system may include a memory, interface, and processor. The memory may store skill area and skill level identifiers, and associated job experience data items describing tasks of a user within the skill area and skill level, formal learning data items describing learning activities of a user within the skill area and skill level, and collaborative data items describing collaborative roles of a user within the skill area and skill level. The processor may receive the skill area and skill level identifiers. The processor may retrieve the job experience, formal learning and collaborative data items associated with the skill area and the skill level identifiers. The processor may transform the data items into a roadmap describing the job experience, formal learning and collaborative data items recommended to reach the skill level, and provide the roadmap to the user.

20 Claims, 16 Drawing Sheets

High performance. Delivered.
Recommended Learning: Corporate Strategy

Return to Homepage
myLearning
SiteActions ▶
Take our survey

| Find Next | Trained | Novice | Proficient | Advanced | Expert | How to Use Recommended Learning |
|---|---|---|---|---|---|---|

"Trained" means that you . . . .
Attended a training course or have started performing basic tasks with direct oversight.
To reach "Trained", here are some recommendations:

Formal Learning
- Formal Learning Recommendation 1 [Type-#hs]
- Formal Learning Recommendation 2 [Type-#hs]
- Formal Learning Recommendation 3 [Type-#hs]
- Formal Learning Recommendation 4 [Type-#hs]
- ...

Collaboration

*Identify resources* related to the Specialty, including KX topics pages. Communities of Practice (CoPs), wikis, blogs, discussion forums, communications, newsletters, reading lists, RSS feeds, etc. Recommended resources include:
- <insert links to CoP including wikis, blogs and discussion forums>
- <insert links to Knowledge Assets of high quality including KX topics, Offerings, and Learning Resources, appropriate to this level>
- <insert links to internal and external Communications, RSS feeds, Newsletters, and Publications, appropriate to this level>

*Research* the Specialty using resources identified above.
*Seek career guidance.* Discuss interest with Career Counselor and HR representative. Explore fit, business need, and potential assignments.
*Attend* CoP calls and other Specialty events as appropriate.
*Network.* Identify others who currently work in this Specialty and talk to them about their experiences, the nature of their assignments and any upcoming opportunities.
- <insert links to contacts, appropriate for this level, and guidance to access>

On-the-Job Experience
- On-The-Job Recommendation 1
- On-The-Job Recommendation 2
- On-The-Job Recommendation 3
- On-The-Job Recommendation 4
- ...

☐ Capability
☐ Industry
  ☐ Communications and High Tech
    ☐ Comm-Other
    ☐ Comm-Wireless
    ☐ Comm-Wireline
    ☐ Cross Industry
    ☐ Electronics & High Tech
    ☐ Media & Entertainment
  ☐ Financial
  ☐ Products
  ☐ Public Services
  ☐ Resources

Proficiency Definitions

| | |
|---|---|
| Level 4<br>Expert | Shape, defend and deliver complex solutions. Often asked to be a subject matter expert and may be externally recognized. Have built expertise in other people. Typical Skill Usage: 5+ years in multiple roles or contexts |
| Level 3<br>Advanced | Work independently on complex tasks and resolve problems and exceptions. Coach or supervise others. Typical Skill Usage: 4+ years in multiple roles or contexts |
| Level 2<br>Proficient | Work independently on standard tasks and receive input on more complicated tasks or exceptions. Coach or supervise novices. Typical Skill Usage: 2+ years |
| Level 1<br>Novice | Have foundational skills and perform standard tasks with regular feedback/supervision. Typical Skill Usage: 1+ year |
| Level 0<br>Trained | Attended a training course or have started performing basic tasks with direct oversight. Typical Skill Usage: 3+ months |

| | | |
|---|---|---|
| P4<br>Expert | Articulate differences between extensive scope of products and appropriate fit/usage. | — 840 |
| P3<br>Advanced | Articulate differences in products and appropriate fit/usage. | — 830 |
| P2<br>Proficient | Broaden experience with Microsoft communication / collaboration tools. Recommend greater focus on server-side of selected Microsoft products:<br><Bulleted list of Microsoft products><br>Broaden experience to include IBM and Cisco counterparts to Microsoft tools:<br><Bulleted list of Lotus Notes tools> | — 820 |
| P1<br>Novice | Build deep skills with a specific tool - recommend continued focus on Microsoft products:<br><Bulleted list of Microsoft products> | — 810 |
| P0<br>Trained | Achieve initial exposure to specific tool; recommend initial focus on Microsoft products:<br><Bulleted list of Microsoft products> | — 805 |

| | |
|---|---|
| P4<br>Expert | Relevant Role: WT&C Architect<br>Tasks: Sell solution; Own implementation of end-to-end solution; Manage various collaboration streams; Effectively communicate solution plans/benefits to client leadership; Build client and vendor relationships; Evaluate new vendor product opportunities —940 |
| P3<br>Advanced | Relevant role: WT&C Designer; WT&C Architect<br>Tasks: Understand business drivers and assess solution requirements; Estimate and analyze financials of solution – ROI/TCO; Own detailed design and solution deployment, fit design into overall infrastructure —930 |
| P2<br>Proficient | Relevant role: WT&C Specialist, WT&C Designer<br>Tasks: Focus on being able compare and evaluate tools and understand their impact on the business —920 |
| P1<br>Novice | Relevant role: WT&C Specialist, WT&C Designer<br>Tasks: Focus on being able to design a technical solution —910 |
| P0<br>Trained | Relevant role: WT&C Specialist<br>Tasks: Focus on being able to build and test a technical solution —905 |

Job Experience Framework

To reach the <insert skill level> level:

- Relevant role: e.g. <Specialist>
- Breadth vs. Depth - recommendations:
  - e.g. Achieve initial exposure to <specific tool>; recommend initial focus on <Vendor> products:
  - <insert list of all relevant Vendor products in this space using inventory>
- Required tasks – be able to perform the following tasks:
  - <insert links to appropriate methods for relevant tasks based on role and skill level; OR otherwise identify required tasks by skill level>
- Other kinds of job-related recommendations?
  - How to find project mentors? What type of profile should the mentor have?
  - Project context - Understanding project specific implementation of methods – which roles, who's filling various roles, etc

| | | |
|---|---|---|
| P4<br>Expert | Govern. Ensure that organization's capability development investments are resulting in proficiency and deep specialization that aligns with the business needs:<br>Proactively partner with Capability Development to ensure Recommended Learning is current and appropriate.<br>Assess competency of Accenture to deliver on Specialty Offerings. Seek relevant solutions and interventions.<br>Serve as SME for training content planning / development.<br>Serve as faculty for training delivery.<br>Ensure the learning transfers and is applied within the business. | —1140 |
| P3<br>Advanced | Lead training efforts for the Specialty / DTE.<br>Serve as SME for training content planning / development<br>Serve as faculty for training delivery<br>Explore emerging knowledge for the Specialty<br>Recommend additions to Required Curriculum or Recommended Learning for the Specialty | —1130 |
| P2<br>Proficient | Champion a Learning Culture for practitioners within the Specialty.<br>Deepen awareness of the value proposition for Accenture and the clients.<br>Expand knowledge of alternatives, options, advantages, and challenges.<br>Translate change expectations to practitioners. | —1120 |
| P1<br>Novice | Deepen your understanding of the Specialty products, offerings, and value proposition.<br>Complete more in-depth, product-specific training courses<br>Recommend initial focus on Microsoft products<br>Expand training courses to include coverage of additional products within a product suite<br>Again, recommend initial focus on Microsoft products. | —1110 |
| P0<br>Trained | Build a fundamental understanding of the Specialty.<br>Complete initial, product-specific training courses on a single product type<br>Recommend initial focus on Microsoft products | —1105 |

Formal Learning Framework

To reach the <insert skill level> level:

- Learning Role in Specialty
  - <insert skill-specific guidance -- e.g. building foundational knowledge(P0), deepening knowledge of products/offerings/etc (P1), champion a learning culture (P2), govern learning investments (P4), etc>
- Complete the Following Recommended Formal Learning Activities:
  - <insert courses>
- Leverage Assets:
  - <insert guidance and links to Skill Offerings, Knowledge assets, reading lists, communications, newsletters, RSS feeds, etc>
- Access Learning Resources:
  - <insert guidance and links to Hot Topics, Workshop Materials, Alliance/vendor Training, etc>
- Access Reference Materials:
  - <insert Specialty-specific internal communications and research>
  - <insert Specialty-specific external publications>

| | | |
|---|---|---|
| P4<br>Expert | Govern. Ensure that organization's collaboration investments are resulting in more specialized skills and knowledge; stronger networks; and more innovations, market relevant solutions.<br>  Proactively contact leaders of CoPs to identify trends, common questions, emerging issues…<br>  Offer to assist and speak to CoP.<br>  Survey relevant audiences on the impact of collaborative activities.<br>  Provide quality assurance input to Capability Development<br>Represent your expertise and Accenture by presenting at external conferences and/or publishing in professional journals. | —1340 |
| P3<br>Advanced | Lead a CoP, networking events, wiki's, blogs, and discussions. Cultivate a strategy to promote the value of collaborative activities. Lead client workshops.<br>  <Specialty-specific links provided> | —1330 |
| P2<br>Proficient | Contribute. Serve as SME on projects.  Conduct sessions for the CoP, respond to blog entries, contribute to a wiki, answer questions on Discussion Board, organize networking forums.<br>  <Specialty-specific links provided> | —1320 |
| P1<br>Novice | Actively participate.  Volunteer to assist with CoP tasks, suggest agenda items, post questions to the Discussion Board, participate in and support networking events.<br>  <Specialty-specific links provided> | —1310 |
| P0<br>Trained | Identify and research collaboration resources related to the Specialty e.g. Communities of Practice (CoPs), wiki's, blogs, discussion forums, etc.<br>  <Specialty-specific links provided><br>Attend CoP calls and other Specialty events as appropriate. | —1305 |

- Role in Collaboration Forums – CoPs, Discussion Forums, Wikis, Blogs, etc.
  - Evolves from attending (P0), participating (P1), contributing (P2), leading (P3), governing (P4)
  - Specific links provided to collaboration vehicles appropriate to each P-level
- Mentor those at lower skill levels.
- Expand network.
  - Specialty Key Contacts provided as appropriate to each skill level. Specific recommendations provided in terms of how/when to engage these contacts.

1400

FIG. 14

SYSTEM FOR PROVIDING ROADMAPS FOR BUILDING PROFICIENCIES IN SKILL AREAS

TECHNICAL FIELD

The present description relates generally to a system and method, generally referred to as a system, for providing roadmaps for building proficiencies in skill areas, and more particularly, but not exclusively, to providing a repeatable process for developing and delivering targeted guides for building specialized proficiency in skills by combining critical and specific job experiences, the supporting collaboration activities, and formal learning.

BACKGROUND

Organizations often implement learning systems to assist their employees with building proficiencies in skill areas. Learning systems may provide employees with guidance on formal learning activities relevant to building a proficiency in a skill area, such as lists of training courses or other training activities. However, formal learning may be one of many methods for building proficiencies in skill areas. Employees may also build proficiencies in skill areas through informal learning activities, such as job experience, methodologies and collaboration. Guidance on informal learning activities relevant to a skill area may not be included in the learning systems, and/or may not be available at all. Thus, it may be difficult for an organization to provide consistent, quality direction to their employees to build proficiencies in skill areas relevant to the organization's business model. Likewise, it may be difficult for employees to determine how to build proficiencies in skill areas relevant to the organization's business model.

SUMMARY

A system for providing roadmaps for building proficiencies in skill areas may include a memory, an interface, and a processor. The memory may be connected to the processor and the interface and may store job experience data items, formal learning data items and collaborative data items associated with a skill area identifier identifying a skill area of a plurality of skill areas within an organization and a skill level identifier identifying a skill level of a plurality of skill levels within the skill area. The job experience data items may describe tasks which are performed by a user within the skill area having the skill level. The formal learning data items may describe learning activities performed by the user within the skill area having the skill level. The collaborative data items may describe roles in a collaborative forum of a user within the skill area having the skill level. The interface may be operative to communicate with a device of a user. The processor may receive, from the device of the user via the interface, the skill area identifier and the skill level identifier. The processor may retrieve the job experience data items, formal learning data items and collaborative data items associated with the skill area identifier and the skill level identifier. The processor may transform the data items into a roadmap. The roadmap may describe the job experience data items, formal learning data items and collaborative data items recommended to reach the skill level identified by the skill level identifier. The processor may provide, to the device of the user via the interface, the skill area identifier, skill level identifier and the roadmap Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 5 is a screenshot of a user interface displaying a roadmap for building proficiency in a skill area in the system of FIG. 1, or other systems for providing roadmaps for building proficiencies in skill areas.

FIG. 5A is a screenshot of a user interface for displaying job experience, formal learning and collaborative data items for building proficiencies across all skill areas of an individual in the system of FIG. 1, or other systems for providing roadmaps for building proficiencies in skill areas.

FIG. 6 is a graph displaying exemplary skill level descriptions in the system of FIG. 1, or other systems for providing roadmaps for building proficiencies in skill areas.

FIG. 7 is a graph displaying behavioral characteristics and growth enablers associated with exemplary skill levels in the system of FIG. 1, or other systems for providing roadmaps for building proficiencies in skill areas.

FIG. 8 is a graph displaying job experiences associated with exemplary skill levels in the system of FIG. 1, or other systems for providing roadmaps for building proficiencies in skill areas.

FIG. 9 is a graph displaying job experiences associated with exemplary skill levels in a skill area in the system of FIG. 1, or other systems for providing roadmaps for building proficiencies in skill areas.

FIG. 10 is a framework of an exemplary job experience roadmap in the system of FIG. 1, or other systems for providing roadmaps for building proficiencies in skill areas.

FIG. 11 is a graph displaying formal learning activities associated with exemplary skill levels in the system of FIG. 1, or other systems for providing roadmaps for building proficiencies in skill areas.

FIG. 12 is a framework of an exemplary formal learning roadmap in the system of FIG. 1, or other systems for providing roadmaps for building proficiencies in skill areas.

FIG. 13 is a graph displaying collaborative roles associated with exemplary skill levels in the system of FIG. 1, or other systems for providing roadmaps for building proficiencies in skill areas.

FIG. 14 is a framework of an exemplary collaboration roadmap in the system of FIG. 1, or other systems for providing roadmaps for building proficiencies in skill areas.

DETAILED DESCRIPTION

A system and method, generally referred to as a system, may relate to providing roadmaps for building proficiencies in skill areas, and more particularly, but not exclusively, providing a repeatable process for developing and delivering targeted guides for building specialized proficiency in skills by combining critical and specific job experiences, the supporting collaboration activities, and formal learning. The principles described herein may be embodied in many different forms.

Figure 1:
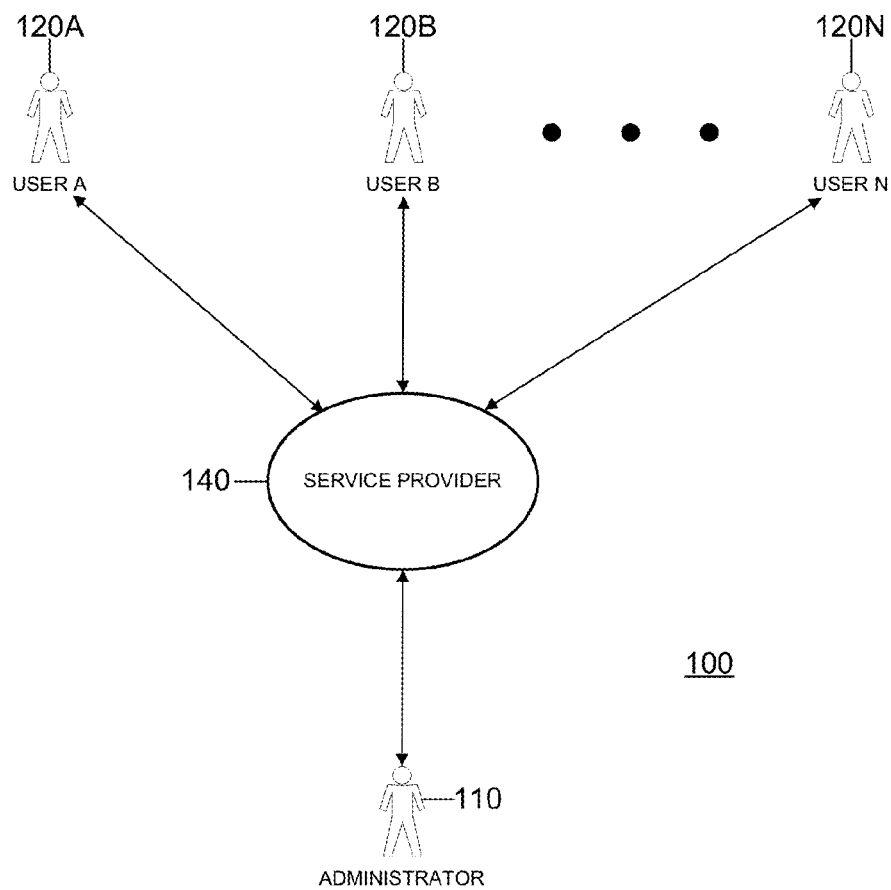
FIG. 1 is a block diagram of a general overview of a system for providing roadmaps for building proficiencies in skill areas.

FIG. 1 provides a general overview of a system 100 for providing roadmaps for building proficiencies in skill areas. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more users 120A-N, a service provider 140, and an administrator 110. The users 120A-N may be employees of an organization who are skilled professionals specializing in a variety of skill areas, such as collaboration/communication solutions, workplace technology solutions, and operations/managed infrastructure services. The organization may provide services, such as consulting services, and may be located in several geographic regions across the world. The users 120A-N may specialize in one or more of the skill areas and may have an identifiable skill level within each skill area. For example, the users 120A-N may have a skill level of trained, novice, proficient, advanced, and expert. The skills associated with these exemplary skill levels are discussed in more detail in FIGS. 6-7 below.

The service provider 140 may identify the formal learning activities, such as training courses, and informal learning activities, such as job experiences and collaborative roles, associated with each of the skill levels within each of the skill areas. For example, the job experiences associated with each of the exemplary skill levels are discussed in FIG. 9 below, the formal learning activities associated with each of the exemplary skill levels are discussed in FIG. 11 below, and the collaborative roles associated with each of the exemplary skill levels are discussed in FIG. 13 below.

The service provider 140 may use the formal and informal learning activities associated with each skill area and skill level to provide the users 120A-N with roadmaps for building proficiencies in the skill areas. The users 120A-N may use the roadmaps to effectively build deep functional, technical, and industry skills relevant to the organization's business model. The roadmaps may provide the users 120A-N with both the formal and informal learning activities relevant to building a proficiencies in the skill areas.

For example, a user A 120A may request a roadmap for a skill area the user A 120A participates in, and the skill level the user A 120A has within the skill area. The service provider 140 may retrieve data describing formal and informal learning activities relevant to the skill area and skill level from disparate data sources. The service provider 140 may assemble the data describing the formal and informal learning activities into a roadmap, and may provide the roadmap to the user A 120A, such as through a web page. The roadmap may include one or more of the formal learning activities, such as training activities, recommended for a user A 120A in the skill area having the skill level. The roadmap may also include one or more informal learning activities, such as collaborative roles recommended for a user A 120A in the skill area having the skill level, and job experiences recommended for a user A 120A in the skill area having the skill level. The steps of assembling a roadmap for building proficiency in a skill area are discussed in more detail in FIG. 3 below.

Alternatively or in addition, the user A 120A may participate in multiple skill areas and may have different skill levels within each skill area. In this case, the service provider 140 may receive a list of the skill areas and skill levels of the user A 120A. For example, an external system may assess the skill level of the user A 120A within the skill areas and may provide the skill areas and skill levels to the service provider 140. The service provider 140 may retrieve data describing formal and informal learning activities relevant to each skill area and each skill level from disparate data sources and may assemble the data into an aggregate roadmap. The service provider 140 may provide the roadmap to the user A 120A. The user A 120A may use the roadmap to identify the formal and informal learning activities relevant to each skill area and skill level of the user A 120A. The steps of assembling an aggregate roadmap for building proficiencies across multiple skill areas are discussed in more detail in FIG. 4 below.

The service provider 140 may display the roadmap to the user A 120A in a format that is clear and concise, such as through a graphical user interface. The graphical user interface may include individual roadmaps for the recommended formal learning activities, job experiences, and collaborative roles. The individual roadmaps may be derived from frameworks associated with the formal learning activities, the job experiences and the collaborative roles. For example, an exemplary framework of a job experience roadmap is shown and discussed in FIG. 10 below, an exemplary framework of a formal learning roadmap is shown and discussed in FIG. 12 below, and an exemplary framework of a collaborative roadmap is shown and discussed in FIG. 14 below. The job experience, formal learning, and collaborative roadmaps may be transformed into the graphical user interface shown and discussed in FIG. 5 below.

The administrator 110 may be a person or an automated process, and may be responsible for maintaining a database storing the formal learning, job experience and collaborative role data associated with each skill area and skill level. The database may be manually compiled by the administrator 110 by aggregating disparate skill area data located throughout the organization. The information may be aggregated across both geographic locations of the organization and/or departments of the organization. Alternatively or in addition, the administrator 110 may use an automated process to retrieve the data from various data sources within the organization. For example, the administrator 110 may configure one or more data feeds from relevant data sources within the organization. The data feeds may provide updated data to the system 100 whenever the data sources are modified.

Alternatively or in addition, in the case of an organization that provides consulting services, the administrator 110 may be a consultant who provides consulting services to one or more clients of the organization. The administrator 110 may maintain the skill levels, skill areas, and associated formal and informal learning activities for each client of the organization. The administrator 110 may work with various departments of each client to identify and retrieve the relevant data required by the system 100. The administrator 110 may configure one or more data feeds to provide updated data from the clients to the system 100 whenever the client data is modified.

Figure 2:
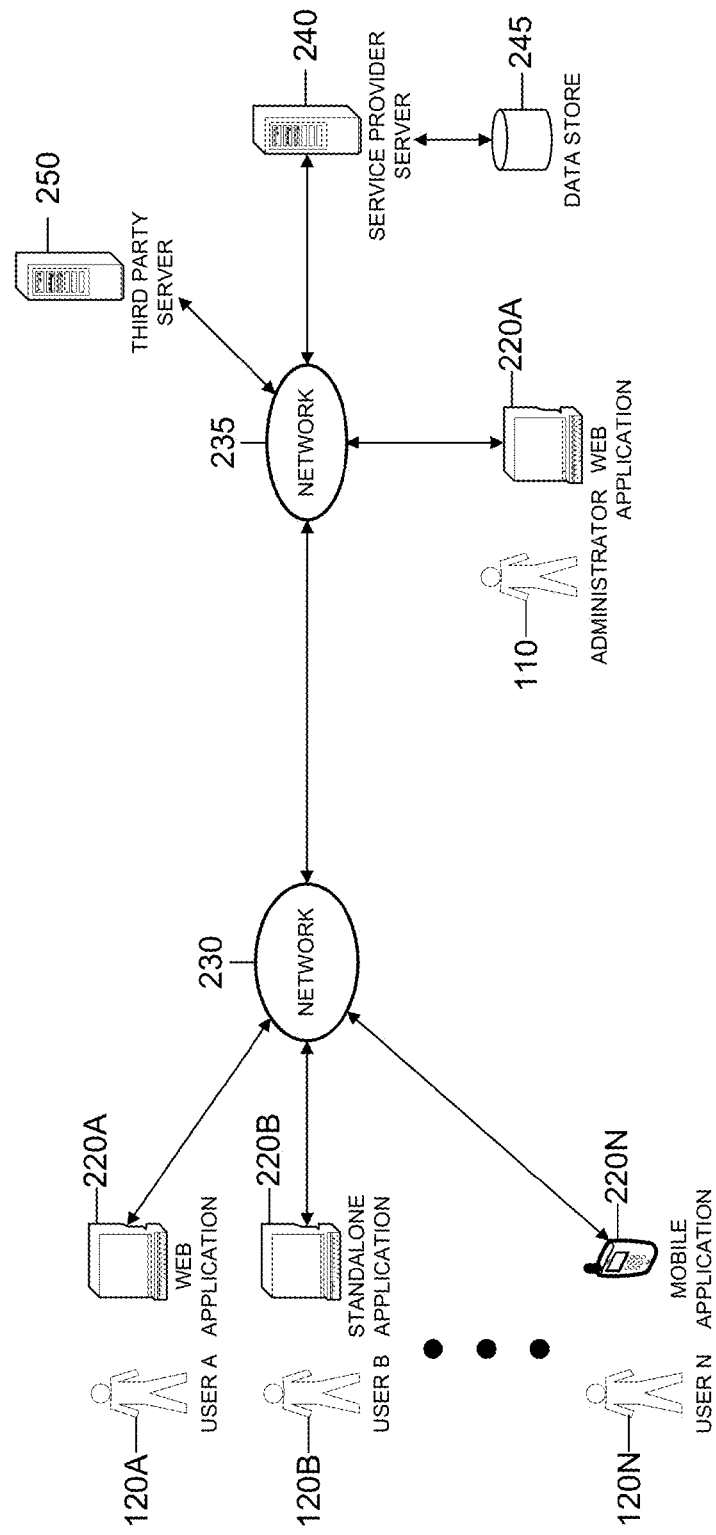
FIG. 2 is a block diagram of a network environment implementing the system of FIG. 1 or other systems for providing roadmaps for building proficiencies in skill areas.

FIG. 2 provides a simplified view of a network environment 200 implementing the system of FIG. 1 or other systems for providing roadmaps for building proficiencies in skill areas. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 200 may include one or more users 120A-N, an administrator 110, a service provider server 240, a third party server 250, a data store 245, networks 230, 235, and one or more web applications, standalone applications, mobile applications 220A-N, which may collectively be referred to as client applications.

Some or all of the service provider server 240 and the third party server 250 may be in communication with each other by way of network 235. The administrator 110 may use a web application 220A to interface with the service provider server 240 and maintain the database of skill areas, skill levels, and associated formal and informal learning data stored in the data store 245. Alternatively or in addition, the administrator 110 may use a mobile application 220N or a standalone application 220B to interface with the service provider server 240.

The networks 230, 235 may include wide area networks (WAN), such as the Internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The web applications, standalone applications and mobile applications 220A-N may be connected to the network 230 in any configuration that supports data transfer. This may include a data connection to the network 230 that may be wired or wireless. Any of the web applications, standalone applications and mobile applications 220A-N may individually be referred to as a client application. The web application 220A may run on any platform that supports web content, such as a web browser or a computer, a mobile phone, personal digital assistant (PDA), pager, network-enabled television, digital video recorder, such as TIVO®, automobile and/or any appliance or platform capable of data communications. The web application 220A may support a rich internet application implemented with the ADOBE FLEX® technologies. Alternatively or in addition the web application 220A may be developed using one or more of the following technologies: ADOBE FLEXBUILDER 3®, ADOBE FLEX SUBCLIPSE®, or generally any web development technologies.

The standalone application 220B may run on a machine that may have a processor, memory, a display, a user interface and a communication interface. The processor may be operatively connected to the memory, display and the interfaces and may perform tasks at the request of the standalone application 220B or the underlying operating system. The memory may be capable of storing data. The display may be operatively connected to the memory and the processor and may be capable of displaying information to the user B 120B. The user interface may be operatively connected to the memory, the processor, and the display and may be capable of interacting with a user B 120B. The communication interface may be operatively connected to the memory, and the processor, and may be capable of communicating through the networks 230, 235 with the service provider server 240. The standalone application 220B may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, ADOBE FLEX®, amongst others.

The mobile application 220N may run on any mobile device that may have a data connection. The data connection may be a cellular connection, a wireless data connection, an internet connection, an infra-red connection, a Bluetooth connection, or any other connection capable of transmitting data. For example, the mobile application 220N may be an application running on an APPLE IPHONE®.

The service provider server 240 may include one or more of the following: an application server, a mobile application server, a data store, a database server, and a middleware server. The service provider server 240 may exist on one machine or may be running in a distributed configuration on one or more machines.

Figure 15:
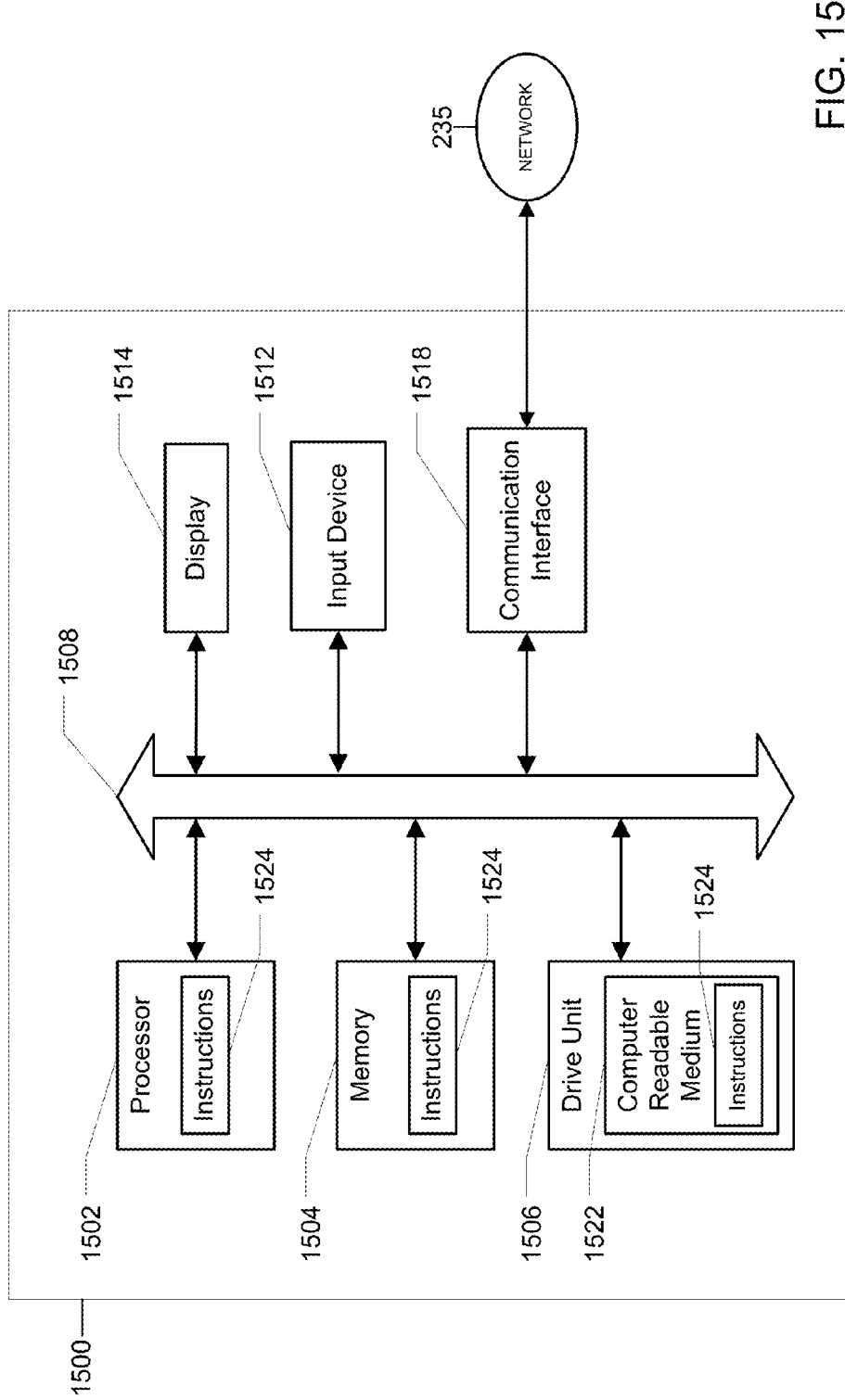
FIG. 15 is an illustration of a general computer system that may be used in the systems of FIG. 2, or other systems for providing roadmaps for building proficiencies in skill areas.

The service provider server 240 and client applications 220A-N may be one or more computing devices of various kinds, such as the computing device in FIG. 15. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web application 220A may employ the Hypertext Transfer Protocol ("HTTP") to request information, such as a web page, from a web server, which may be a process executing on the service provider server 240.

There may be several configurations of database servers, application servers, mobile application servers, and middleware applications included in the service provider server 240. The data store 245 may be part of the service provider server 240 and may be a database server, such as MICROSOFT SQL SERVER®, ORACLE®, IBM DB2®, SQLITE®, or any other database software, relational or otherwise. The application server may be APACHE TOMCAT®, MICROSOFT IIS®, ADOBE COLDFUSION®, or any other application server that supports communication protocols. The skill areas, skill levels and associated job experience data items, formal learning data items and collaborative role data items may be stored in the data store 245.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

In operation, the user A 120A may access the service provided by the service provider server 240 through the web application 220A and the network 230. The user A 120A may interact with the service provider server 240 through the web application 220A. The data may be passed between the web application 220A and the database 245. The majority of the calculations may be performed on the service provider server 240, although some calculations may be completed on the web application 220A in order to speed up response times.

Figure 3:
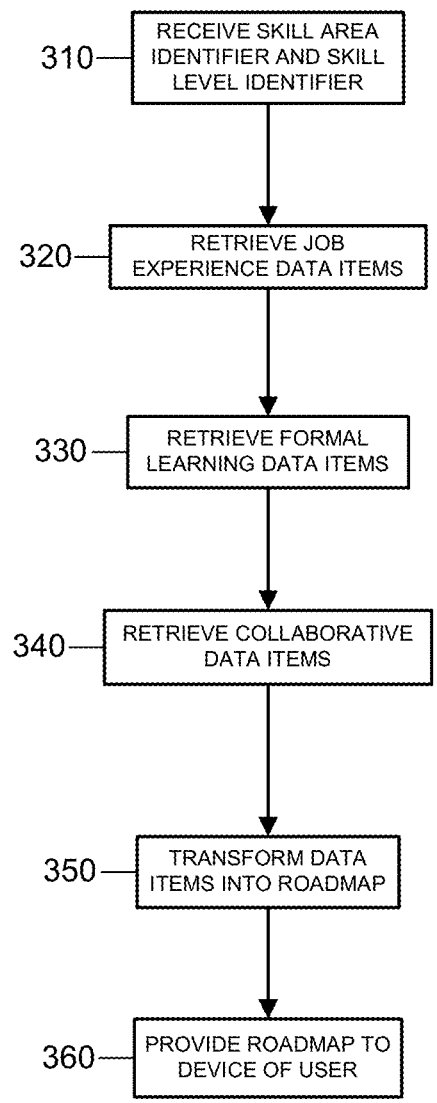
FIG. 3 is a flowchart illustrating the steps of assembling a roadmap for building proficiency in a skill area in the system of FIG. 1 or other systems for providing roadmaps for building proficiencies in skill areas.

FIG. 3 is a flowchart illustrating the steps of assembling a roadmap for building proficiency in a skill area in the system of FIG. 1 or other systems for providing roadmaps for building proficiencies in skill areas. The steps of FIG. 3 are described as being performed by the service provider server 240. However, the steps may be performed by the processor of the service provider server 240, or by any other hardware component of the service provider server 240. Alternatively the steps may be performed by an external hardware component.

At step 310, the service provider server 240 may receive a skill area identifier and a skill level identifier. For example, a user A 120A may select a skill area identifier and a skill level identifier from a drop down box on a web page. The user A 120A may then click on a submit button to communicate the selected skill area identifier and skill level identifier to the service provider server 240. At step 320, the service provider server 240 may retrieve job experience data items associated with the skill area identifier and skill level identifier selected by the user A 120A. The job experience data items may describe job experiences recommended for a user A 120A in the skill area having the skill level. The job experience data items associated with each exemplary skill level are discussed in more detail in FIGS. 8-10 below.

At step 330, the service provider server 240 may retrieve the formal learning data items associated with the skill area identifier and skill level identifier selected by the user A 120A. The formal learning data items may describe learning activities recommended for a user A 120A in the skill area having the skill level. The formal learning data items associated with each exemplary skill level are discussed in more detail in FIGS. 11-12 below. At step 340, the service provider server 240 may retrieve the collaborative data items associated with the skill area identifier and skill level identifier selected by the user A 120A. The collaborative data items may describe collaborative roles recommended for a user A 120A within the skill area having the skill level. The collaborative data items associated with each exemplary skill level are discussed in more detail in FIGS. 13-14 below.

At step 350, the service provider server 240 may transform the job experience data items, the formal learning data items and the collaborative data items into a roadmap. The service provider server 240 may utilize frameworks to transforming the job experience data items, the formal learning data items and the collaborative date items into a roadmap. For example, the service provider server 240 may utilize the job experience framework 1000 of FIG. 10, the formal learning framework 1200 of FIG. 12, and the collaborative framework 1400 of FIG. 14.

At step 360, the service provider server 240 may provide the roadmap to the user A 120A. For example, the service provider server 240 may communicate the roadmap to a computing device of the user A 120A. The roadmap may be in the format of a graphical user interface, such as the user interface 500, which displays an exemplary roadmap.

Figure 4:
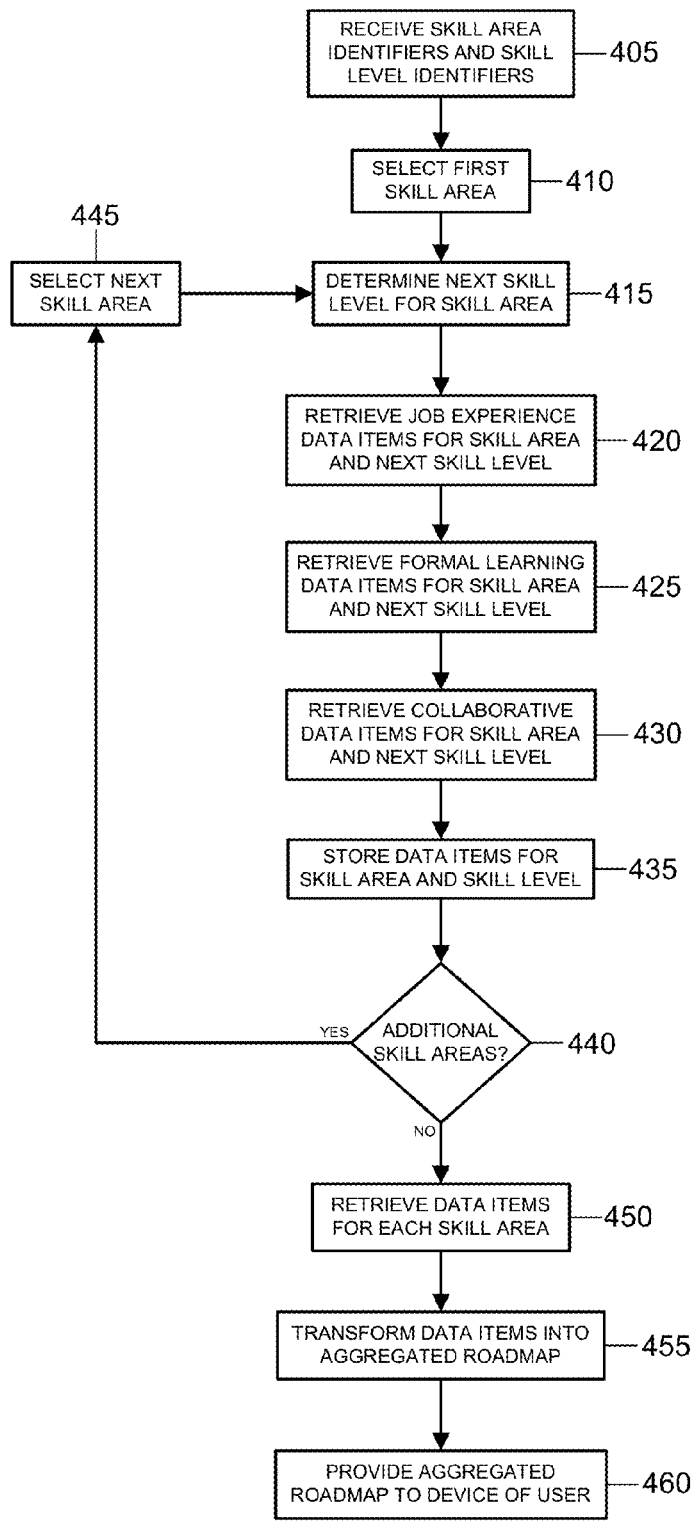
FIG. 4 is a flowchart illustrating the steps of assembling an aggregate roadmap for building proficiencies across multiple skill areas in the system of FIG. 1, or other systems for providing roadmaps for building proficiencies in skill areas.

FIG. 4 is a flowchart illustrating the steps of assembling an aggregate roadmap for building proficiencies across multiple skill areas in the system of FIG. 1, or other systems for providing roadmaps for building proficiencies in skill areas. The steps of FIG. 4 are described as being performed by the service provider server 240. However, the steps may be performed by the processor of the service provider server 240, or by any other hardware component of the service provider server 240. Alternatively the steps may be performed by an external hardware component.

At step 405, the service provider server 240 may receive multiple skill area identifiers and skill level identifiers for a user A 120A. Each skill area identifier may be associated with a skill level identifier identifying the skill level of the user A 120A within the skill area. The service provider server 240 may receive the skill area identifiers and skill level identifiers from an external source, such as the third party server 250. Alternatively or in addition, the user A 120A may provide the skill area identifiers and skill level identifiers to the service provider server 240.

At step 410, the service provider server 240 may select the first skill area identifier and associated skill level identifier. At step 420, the service provider server 240 may determine the next skill level achievable by the user A 120A in the skill area identified by the skill area identifier. At step 420, the service provider server 240 may retrieve the job experience data items associated with the skill area and the next skill level. At step 425, the service provider server 240 retrieves the formal learning data items associated with the skill area and the next skill level. At step 430, the service provider server 240 retrieves the collaborative data items associated with the skill area and the next skill level. At step 435, the service provider server 240 stores the job experience data items, formal learning data items and collaborative data item associated with the skill area and the next skill level, such as in the data store 245.

At step 440, the service provider server 240 determines whether additional skill areas were received for the user A 120A. If, at step 440, the service provider server 240 determines that additional skill areas were received for the user A 120A, the service provider server 240 moves to step 445. At step 445, the service provider server 240 selects the next received skill area and repeats step 415-440 for the next received skill level. Once the service provider server 240 has repeated steps 415-440 for each of the received skill areas, the service provider server 240 moves to step 450.

At step 450, the service provider server 240 retrieves the data items stored for each skill area and associated skill level, such as from the data store 245. At step 455, the service provider server 240 transforms the data items into an aggregated roadmap. The aggregated roadmap may display the job experience data items, formal learning data items and collaborative data items recommended for the user A 120A for each of the skill areas and associated skill levels. The service provider server 240 may use one or more frameworks to transform the data items into the roadmap. For example, the service provider server 240 may utilize the job experience framework 1000 of FIG. 10, the formal learning framework 1200 of FIG. 12, and the collaborative framework 1400 of FIG. 14.

At step 460, the service provider server 240 may provide the aggregated roadmap to the user A 120A, such as to a computing device of the user A 120A. For example, the service provider server 240 may provide a web page displaying the aggregated roadmap to a computing device of the user A 120A.

FIG. 5 is a screenshot of a user interface 500 displaying a roadmap for building proficiency in a skill area in the system of FIG. 1, or other systems for providing roadmaps for building proficiencies in skill areas. The user interface 500 may include a skill level tabset 505, a formal learning subsection 510, a collaboration subsection 520, and a job experience subsection 530. The formal learning subsection 510 may display the formal learning data items to the user A 120A, the collaboration subsection 520 may display the collaborative data items to the user A 120A, and the job experience subsection 530 may display the job experience data items to the user A 120A.

The user A 120A may use the skill level tabset 505 to view a roadmap associated with a different skill level within the skill area. When the user A 120A selects a different skill level tab from the skill level tabset 505, the user interface 500 may update the subsections 510, 520, 530 to display the data items associated with the selected skill level.

Figure 5A:
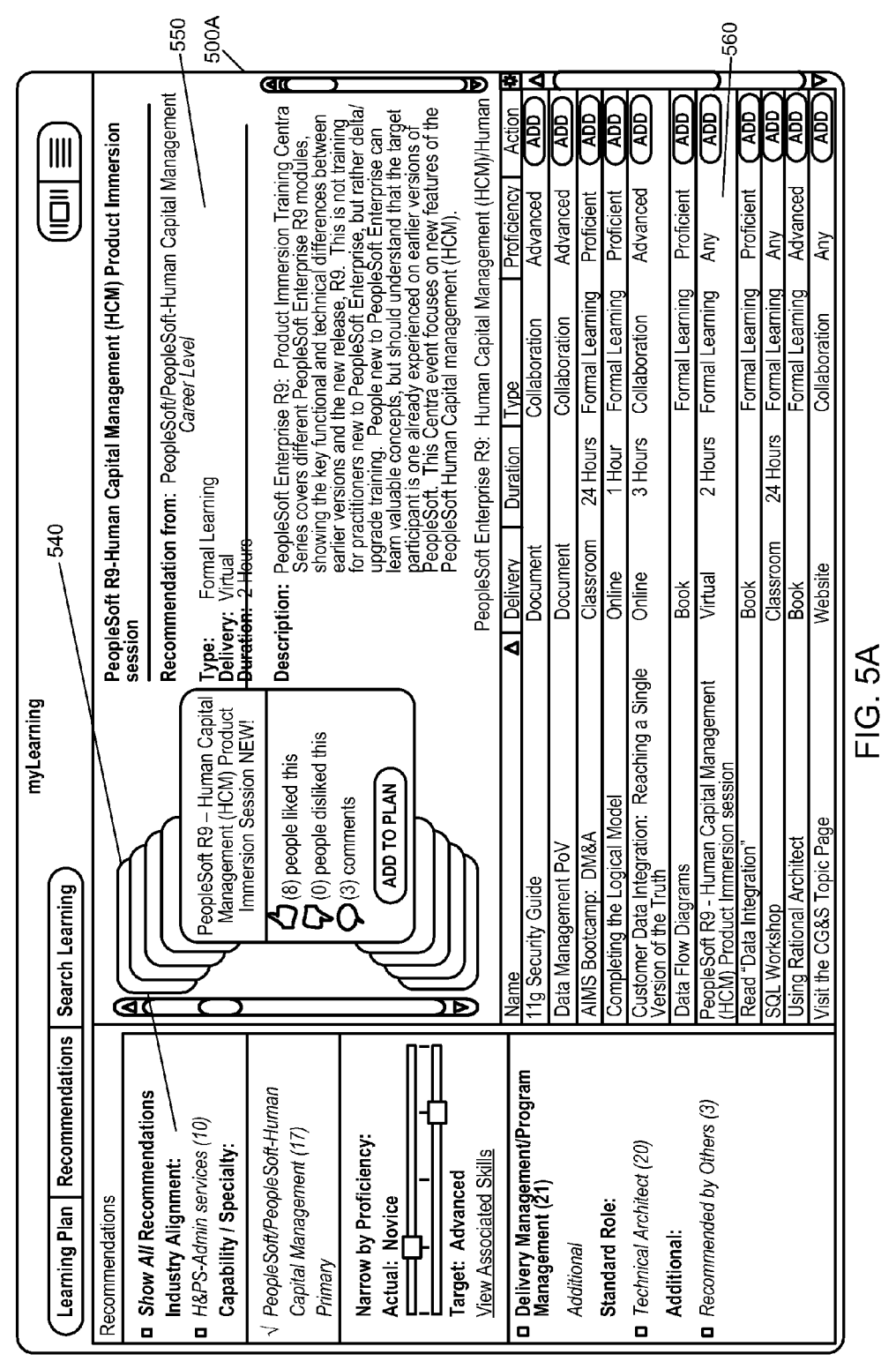

FIG. 5A is a screenshot of a user interface 500A for displaying job experience, formal learning and collaborative data items for building proficiencies across all skill areas of an individual in the system of FIG. 1, or other systems for providing roadmaps for building proficiencies in skill areas. The user interface 500A may include a recommendations subsection 540, a detailed description subsection 550, and a list subsection 560. The list subsection 560 may display the job experience, formal learning, and collaborative data items suggested to a user A 120A for building proficiencies across all of the skill areas relevant to the user A 120A. The user A 120A may use the recommendations subsection 540 to filter the job experience, formal learning and collaborative data items displayed in the list subsection 560, such as by selecting one or more skill areas to view recommendations for. The details subsection 560 may display details of a job experience, formal learning, or collaborative data item selected by the user A 120A from the list subsection 560. The steps of assembling the job experience, formal learning and collaborative data items for building proficiencies across multiple skill areas are discussed in more detail in FIG. 4 above.

FIG. 6 is a graph 600 displaying exemplary skill level descriptions in the system of FIG. 1, or other systems for providing roadmaps for building proficiencies in skill areas. The graph 600 may include a trained description 605, a novice description 610, a proficient description 620, an advanced description 630, and an expert description. The descriptions 605, 610, 620, 630, 640 may be exemplary descriptions of skill levels of a user A 120A in an organization.

For example, a user A 120A with a skill level of 0, or trained, in a skill area may have attended a training course or may have started performing basic tasks in the skill area with direct oversight. A user A 120A with a skill level of trained often has at least three months of experience in the skill area. A user A 120A with a skill level of 1, or novice, in a skill area may have foundational skills in the skill area and may perform standard tasks in the skill area with regular feedback/supervision. A user A 120A with a skill level of novice often has at least one year of experience in the skill area. A user with a skill level of 2, or proficient, in a skill area may work independently on standard tasks in the skill area and may receive input on more complicated tasks or exceptions. In addition, a user with a skill level of proficient may coach or supervise users 120A-N with a skill level of novice in the skill area. A user A 120A with a skill level of proficient often has at least two years of experience in the skill area.

A user A 120A with a skill level of 3, or advanced, in a skill level may work independently on complex tasks in the skill area and may resolve problems and exceptions. Also, a user A 120A with a skill level of advanced may coach or supervise others in the skill area. A user A 120A with a skill level of advanced may often have at least four years of experience in multiple roles or contexts in the skill area. A user with a skill level of 4, or expert, in a skill area, may shape, defend and deliver complex solutions in the skill area. A user A 120A with a skill level of expert may often be asked to be a subject matter expert and may be externally recognized. A user A 120A with a skill level of expert may have built expertise in other people. A user A 120A with a skill level of expert may often have at least five years of experience in the skill area.

Figure 7:
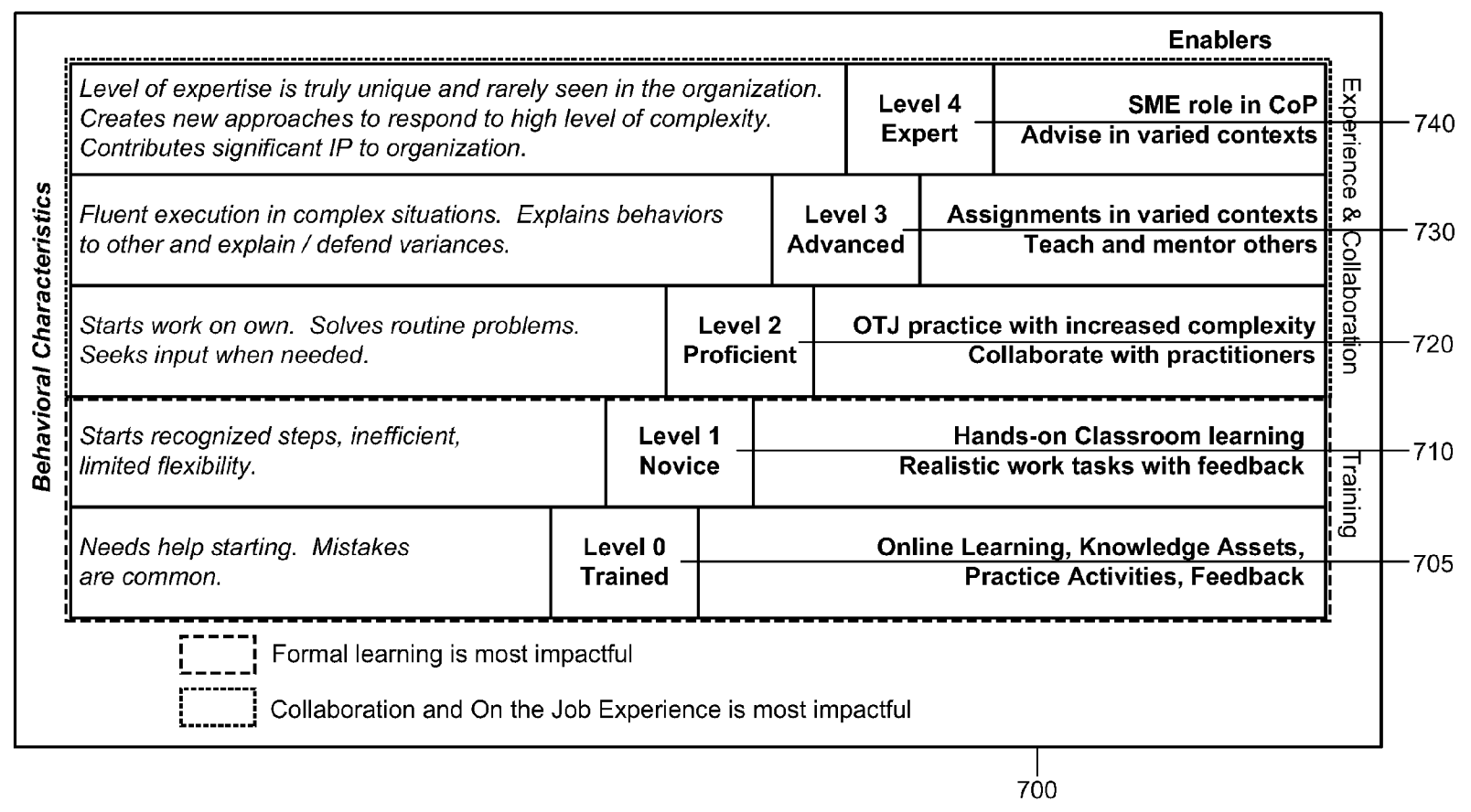

FIG. 7 is a graph 700 displaying behavioral characteristics and growth enablers associated with exemplary skill levels in the system of FIG. 1, or other systems for providing roadmaps for building proficiencies in skill areas. The graph 700 may include a trained skill level 705, a novice skill level 710, a proficient skill level 720, an advanced skill level 730, and an expert skill level 740.

The skill levels 705, 710, 720, 730, 740 may each be associated with behavioral characteristics and enablers. The behavioral characteristics may describe behavior often associated with a user A 120A having the skill level, while the enablers may describe formal training, collaborative learning, and job experience data items recommended for a user A 120A having each skill level. For example, a user A 120A having the trained skill level 705 may exhibit behavioral characteristics of often needing help starting and often making mistakes. The user A 120A having the trained skill level 705 may improve their skills by participating in online learning, researching knowledge assets, performing practice activities, and receiving feedback. A user A 120A having the novice skill level 710 may exhibit behavioral characteristics of starting to recognize steps, but being inefficient and having limited flexibility in the skill area. The user A 120A having the novice skill level 710 may improve their skills by participating in hands-on classroom learning and performing realistic work tasks with feedback.

A user A 120A having the proficient skill level 720 may exhibit behavioral characteristics of working on their own, solving routine problems and seeking input when needed. The user A 120A having the proficient skill level 720 may improve their skills by participating in on the job training practice with increased complexity, and collaborating with practitioners. A user A 120A having the advanced skill level 730 may exhibit behavioral characteristics of having fluent execution in complex situations, being able to explain their behaviors to others and being able to explain/defend variances in their behaviors. The user A 120A having the advanced skill level 730 may improve their skills by performing assignments in varied contexts and teaching and mentoring others. A user A 120A having the expert skill level 740 may exhibit behavioral characteristics of creating new approaches to respond to high levels of complexity and contributing significant intellectual property to the organization. A user having the expert skill level 740 may also improve their skills by having a subject matter expert role in collaborative forums and advising in varied contexts.

The graph 700 demonstrates that formal learning may be most impactful for users 120A-N having the exemplary skill levels of trained or novice, while collaboration and on the job experience may be most impactful for users 120A-N having the exemplary skill levels of proficient, advanced, or expert.

FIG. 8 is a graph 800 displaying job experiences associated with exemplary skill levels in the system of FIG. 1, or other systems for providing roadmaps for building proficiencies in skill areas. The graph 800 may include a trained skill level 805, a novice skill level 810, a proficient skill level 820, an advanced skill level 830, and an expert skill level 840. The skill levels 805, 810, 820, 830, 840 may provide descriptions of job experiences associated with a user A 120A having each of the skill levels 805, 810, 820, 830, 840.

For example, a user A 120A having the trained skill level 805, may have job experiences of achieving initial exposure to a specific tool. The initial focus may be on the software products of a particular vendor, such as MICROSOFT®. A user A 120A having the novice skill level 810 may have a job experience of building deep skills with a specific tool. A user A 120A having the proficient skill level 820 may have job experiences of broadening their experience with vendor products, such as focusing on server-side products of the vendor. The user A 120A having the proficient skill level may also broaden their experience to include other vendors which provide counterpart tools, such as CISCO® or IBM®. A user A 120 having the advanced skill level 830 may have job experiences of articulating differences in products and the appropriate fit/usage of the products. A user A 120A having the expert skill level 840 may have job experiences of articulating differences between extensive scope of products and the appropriate fit/usage of the products.

FIG. 9 is a graph 900 displaying job experiences associated with exemplary skill levels in a skill area in the system of FIG. 1, or other systems for providing roadmaps for building proficiencies in skill areas. The graph 900 may include a trained skill level 905, a novice skill level 910, a proficient skill level 920, an advanced skill level 930, and an expert skill level 940. The skill levels 905, 910, 920, 930, 940 may provide job tasks associated with a user A 120A in the skill area of Workplace Technology and Collaboration (WT&C) for each of the skill levels 905, 910, 920, 930, 940.

For example, a user A 120A having the trained skill level 905 may have a role of a specialist and may focus on being able to build and test a technical solution. A user A 120A having the novice skill level 910 may have a role as a specialist or a designer and may focus on being able to design a technical solution. A user A 120A having the proficient skill level 920 may have a role of a specialist or a designer and may focus on being able to compare and evaluate tools and understand their impact on the business of the organization. A user A 120A having the advanced skill level 930 may have a role of a designer or an architect, may understand the business drivers, and may assess solution requirements. The user A 120A may also estimate and analyze financials of the situation, may own detailed design and solution deployment, and may fit their design into the overall infrastructure of the organization. A user having the expert skill level 940 may have a role of an architect and may sell their solution, may own an implementation of an end-to-end solution, may manage various collaboration streams, may effectively communicate solution plans/benefits to client leadership, may build client and vendor relationships, and may evaluate new vendor product opportunities.

FIG. 10 is a framework 1000 of an exemplary job experience roadmap in the system of FIG. 1, or other systems for providing roadmaps for building proficiencies in skill areas. The framework 1000 may provide a template for transforming job experience data items associated with a skill level and a skill area into a roadmap. The framework 1000 may identify the skill level the user A 120A is attempting to reach and may display the role, and the tasks associated with a user A 120A having the identified skill level. The framework 1000 may also display other job-related recommendations such as how to find project mentors, the type of profile the mentor should have, and project context, such as understanding project specific implementation of methods.

FIG. 11 is a graph 1100 displaying formal learning activities associated with exemplary skill levels in the system of FIG. 1, or other systems for providing roadmaps for building proficiencies in skill areas. The graph 1100 may include a trained skill level 1105, a novice skill level 1110, a proficient skill level 1120, an advanced skill level 1130, and an expert skill level 1140. The skill levels 1105, 1110, 1120, 1130, 1140 may provide descriptions of formal learning activities associated with a user A 120A having each of the skill levels 1105, 1110, 1120, 1130, 1140.

For example, a user A 120A having the trained skill level 1105 may build a fundamental understanding of the skill area by completing initial, product-specific training courses on a single product type. The initial focus of the training may be on a particular vendor, such as MICROSOFT®. A user A 120A having the novice skill level 1110 may deepen their understanding of the skill area products, offerings, and value proposition by completing more in-depth, product specific training courses, and expanding their training courses to include coverage of additional products within a product suite. A user A 120A having the proficient skill level 1120 may champion a learning culture for practitioners within the skill area by deepening their awareness of the value proposition for the organization and the clients of the organization, expanding their knowledge of alternatives, options, advantages, and challenges, and translating changed expectations to practitioners.

A user A 120A having the advanced skill level 1130 may lead training efforts for the skill area by serving as a subject matter expert for training, content planning and development, and serving as faculty for training delivery. The user A 120A may also explore emerging knowledge for the skill area by recommending additions to required curriculum or recommended learning for the skill area. A user A 120A having the expert skill level 1140 may govern the skill area by ensuring that the organization's capability development investments are resulting in proficiency and deep specialization that aligns with the business needs of the organization. The user A 120A may also proactively verify that the recommended learning is current and accurate, may assess the competency of the organization to deliver on offerings in the skill area, may serve as a subject matter expert for training, content planning and development, and may ensure the learning transfers to and is applied within the organization.

FIG. 12 is a framework 1200 of an exemplary formal learning roadmap in the system of FIG. 1, or other systems for providing roadmaps for building proficiencies in skill areas. The framework 1200 may provide a template for transforming formal learning data items associated with a skill area and skill level into a roadmap. The framework 1200 may identify the skill level the user A 120A is attempting to reach, may display the learning role of the user A 120A within the skill area, may display recommended formal learning activities, and may display recommended assets, learning resources and reference materials. The learning role of the user A 120A within the skill area may include the roles discussed in FIG. 11 above. The recommended formal learning activities may include a list of recommended courses.

FIG. 13 is a graph 1300 displaying collaborative roles associated with exemplary skill levels in the system of FIG. 1, or other systems for providing roadmaps for building proficiencies in skill areas. The graph 1300 may include a trained skill level 1305, a novice skill level 1310, a proficient skill level 1320, an advanced skill level 1330, and an expert skill level 1340. The skill levels 1305, 1310, 1320, 1330, 1340 may provide descriptions of recommended collaborative roles for a user A 120A having the skill levels 1305, 1310, 1320, 1330, 1340.

For example, a user A 120A having the trained skill level 1305 may identify and research collaboration resources related to the skill area, such as communities of practice (CoP), wiki's, blogs, or discussion forums. The user A 120A having the trained skill level 1305 may also attend CoP calls and other skill area events. A user A 120A having the novice skill level 1310 may actively participate in collaborative forums by volunteering to assist with CoP tasks, suggesting agenda items, posting questions to a discussion board, and participating in and supporting networking events. A user having the proficient skill level 1320 may contribute to collaborative forums by serving as a subject matter expert on projects, conducting sessions for the CoP, responding to blog entries, contributing to a wiki, answering questions on a discussion board, and organizing networking forums.

A user A 120A having the advanced skill level 1330 may lead a CoP, networking events, wiki's blogs and discussions, may cultivate strategy to promote the value of collaborative workshops, and may lead client workshops. A user A 120A having the expert skill level 1340 may govern by ensuring that the organization's collaboration investments are resulting in more specialized skills and knowledge, stronger networks, and more innovations and market relevant solutions. The user A 120 having the expert skill level 1340 may proactively contact leaders of CoPs to identify trends, common questions or emerging issues, may offer to assist and speak to CoP, may survey relevant audiences on the impact of collaborative activities, and may provide quality assurance input. The user A 120A having the expert skill level 1340 may also represent their expertise and the organization by presenting at external conferences and/or publishing in professional journals.

FIG. 14 is a framework 1400 of an exemplary collaboration roadmap in the system of FIG. 1, or other systems for providing roadmaps for building proficiencies in skill areas. The framework 1400 may provide a template for transforming collaborative data items associated with a skill area and skill level into a roadmap. The framework 1400 may identify the skill level the user A 120A is attempting to reach, may display the recommended role of the user A 120A in collaboration activities, the recommended mentoring activities of the user A 120A and the recommended network expanding activities of the user A 120A. The network expanding activities may include key contacts in the skill area for each skill level and specific recommendations regarding how and when to engage the key contacts.

FIG. 15 illustrates a general computer system 1500, which may represent a service provider server 240, or any of the other computing devices referenced herein. The computer system 1500 may include a set of instructions 1524 that may be executed to cause the computer system 1500 to perform any one or more of the methods or computer based functions disclosed herein. The computer system 1500 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1500 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1524 (sequential or otherwise) that specify actions to be taken by that machine. In a particular embodiment, the computer system 1500 may be implemented using electronic devices that provide voice, video or data communication. Further, while a single computer system 1500 may be illustrated, the term "system" shall also be taken to include any collection of systems or subsystems that individually or jointly execute a set, or multiple sets, of instructions to perform one or more computer functions.

As illustrated in FIG. 15, the computer system 1500 may include a processor 1502, such as, a central processing unit (CPU), a graphics processing unit (GPU), or both. The processor 1502 may be a component in a variety of systems. For example, the processor 1502 may be part of a standard personal computer or a workstation. The processor 1502 may be one or more general processors, digital signal processors, application specific integrated circuits, field programmable gate arrays, servers, networks, digital circuits, analog circuits, combinations thereof, or other now known or later developed devices for analyzing and processing data. The processor 1502 may implement a software program, such as code generated manually (i.e., programmed).

The computer system 1500 may include a memory 1504 that can communicate via a bus 1508. The memory 1504 may be a main memory, a static memory, or a dynamic memory. The memory 1504 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 1504 may include a cache or random access memory for the processor 1502. Alternatively or in addition, the memory 1504 may be separate from the processor 1502, such as a cache memory of a processor, the system memory, or other memory. The memory 1504 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 1504 may be operable to store instructions 1524 executable by the processor 1502. The functions, acts or tasks illustrated in the figures or described herein may be performed by the programmed processor 1502 executing the instructions 1524 stored in the memory 1504. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 1500 may further include a display 1514, such as a liquid crystal display (LCD), an organic light emitting diode (OLED), a flat panel display, a solid state display, a cathode ray tube (CRT), a projector, a printer or other now known or later developed display device for outputting determined information. The display 1514 may act as an interface for the user to see the functioning of the processor 1502, or specifically as an interface with the software stored in the memory 1504 or in the drive unit 1506.

Additionally, the computer system 1500 may include an input device 1512 configured to allow a user to interact with any of the components of system 1500. The input device 1512 may be a number pad, a keyboard, or a cursor control device, such as a mouse, or a joystick, touch screen display, remote control or any other device operative to interact with the system 1500.

The computer system 1500 may also include a disk or optical drive unit 1506. The disk drive unit 1506 may include a computer-readable medium 1522 in which one or more sets of instructions 1524, e.g. software, can be embedded. Further, the instructions 1524 may perform one or more of the methods or logic as described herein. The instructions 1524 may reside completely, or at least partially, within the memory 1504 and/or within the processor 1502 during execution by the computer system 1500. The memory 1504 and the processor 1502 also may include computer-readable media as discussed above.

The present disclosure contemplates a computer-readable medium 1522 that includes instructions 1524 or receives and executes instructions 1524 responsive to a propagated signal; so that a device connected to a network 235 may communicate voice, video, audio, images or any other data over the network 235. Further, the instructions 1524 may be transmitted or received over the network 235 via a communication interface 1518. The communication interface 1518 may be a part of the processor 1502 or may be a separate component. The communication interface 1518 may be created in software or may be a physical connection in hardware. The communication interface 1518 may be configured to connect with a network 235, external media, the display 1514, or any other components in system 1500, or combinations thereof. The connection with the network 235 may be a physical connection, such as a wired Ethernet connection or may be established wirelessly as discussed below. Likewise, the additional connections with other components of the system 1500 may be physical connections or may be established wirelessly. In the case of a service provider server 240, the service provider server 240 may communicate with users 120A-N through the communication interface 1518.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 1522 may be a single medium, or the computer-readable medium 1522 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 1522 may include a solid-state memory such as a memory card or other package that houses one or more non-volatile read-only memories. The computer-readable medium 1522 also may be a random access memory or other volatile re-writable memory. Additionally, the computer-readable medium 1522 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A computer-implemented method for providing a roadmap for building proficiency in a skill area, the method comprising:
receiving, on a network interface, from a user device, a skill area identifier identifying a skill area of a plurality of skill areas within an organization, and a skill level identifier identifying a skill level of a plurality of skill levels within the skill area;
wherein the skill levels further include:
a trained skill level;
a novice skill level
a proficient skill level;
an advanced skill level; and
an expert skill level;
retrieving, by a processor from a data store, a plurality of job experience data items associated with the skill area identifier and the skill level identifier, wherein at least one job experience data item describes a task which is performed by a user within the skill area having the skill level;
retrieving, by the processor from the data store, a plurality of formal learning data items associated with the skill area identifier and the skill level identifier, wherein at least one formal learning data item describes a learning activity which is performed by the user within the skill area having the skill level;
retrieving, by the processor from the data store, a plurality of collaborative data items associated with the skill area identifier and the skill level identifier, wherein at least one collaborative data item describes a role in a collaborative forum of the user within the skill area having the skill level, wherein
for the trained skill level, the collaborative data item includes identifying and researching collaboration resources;
for the novice skill level, the collaborative data item includes actively participating in collaborative forums;
for the proficient skill level, the collaborative data item includes contributing to collaborative forums or serving as a subject matter expert on projects;
for the advanced skill level, the collaborative data item includes leading a community of practice and events;
for the expert skill level, the collaborative data item includes proactively contacting leaders of communities of practice, assisting or speaking to communities of practice, or surveying relevant audiences on the impact of collaborative activities;
transforming, by the processor, the plurality of job experience data items, the plurality of formal learning data items and the plurality of collaborative data items into a roadmap, wherein the roadmap describes the job experience data items, formal learning data items and collaborative data items recommended to reach the skill level identified by the skill level identifier; and
providing, via the network interface, the user device, the skill area identifier, the skill level identifier and the roadmap.

2. The computer-implemented method of claim 1 wherein transforming, by the processor, the plurality of job experience data items, the plurality of formal learning data items and the plurality of collaborative data items into a roadmap, wherein the roadmap describes the job experience data items, formal learning data items and collaborative data items recommended to reach the skill level identified by the skill level identifier further comprises:
applying, by the processor, the plurality of job experience data items to a job experience framework;
applying, by the processor, the plurality of formal learning data items to a formal learning framework;
applying, by the processor, the plurality of collaborative data items to a collaborative framework; and
transforming, by the processor, the job experience framework, the formal learning framework, and the collaborative framework into a roadmap.

3. The computer-implemented method of claim 2 wherein the job experience framework describes a plurality of vendor products the user within the skill area having the skill level should be exposed to.

4. The computer-implemented method of claim 2 wherein the formal learning framework describes a plurality of recommended learning resources and reference materials.

5. The computer-implemented method of claim 2 wherein the collaborative framework describes a plurality of persons within the skill area the user should network with.

6. The computer-implemented method of claim 1 wherein the skill area identifier, the skill level identifier and the roadmap are provided to the user via the network interface, through a web page.

7. The computer-implemented method of claim 1, wherein
the trained skill level corresponds to a user that performs basic tasks with direct oversight;
the novice skill level corresponds to a user that performs standard tasks with regular supervision;
the proficient skill level corresponds to a user that performs standard tasks independently and receives supervision on complex tasks;
the advanced skill level corresponds to a user that performs complex tasks and resolves problems; and
the expert skill level corresponds to a user that shapes and delivers solutions to complex tasks.

8. The computer-implemented method of claim 1, wherein
for the trained skill level, the job experience data item includes achieving initial exposure to a specific tool;
for the novice skill level, the job experience data item includes building deep skills with a specific tool;
for the proficient skill level, the job experience data item includes broadening exposure to vendor products with a focus on vendor server-side products;
for the advanced skill level, the job experience data item includes articulating differences in products and appropriate usage of the products;
for the expert skill level, the job experience data item includes articulating differences between extensive scope of products and the usage of the products.

9. A computer implemented method for providing a roadmap for building proficiencies across multiple skill areas, the method comprising:
receiving, on a network interface, a plurality of skill area identifiers describing a plurality of skill areas within an organization and a skill level to be obtained by the user within each skill area;
wherein the skill levels further include:
a trained skill level;
a novice skill level
a proficient skill level;
an advanced skill level; and
an expert skill level;

retrieving, by a processor from a data store, a plurality of job experience data items associated with each skill area identifier and the skill level to be obtained by the user within each skill area, wherein at least one job experience data item associated with each skill area identifier and the skill level identifier describes a task which is performed by a user within the skill area having the skill level;

retrieving, by the processor from the data store, a plurality of formal learning data items associated with each skill area identifier and the skill level to be obtained by the user within each skill area, wherein at least one formal learning data item associated with each skill area identifier and skill level describes a learning activity which is performed by the user within the skill area having the skill level;

retrieving, by the processor from the data store, a plurality of collaborative data items associated with each skill area identifier and skill level to be obtained by the user within the skill area, wherein at least one collaborative data item associated with each skill area identifier and skill level describes a role in a collaborative forum of a user within the skill area having the skill level, wherein
  for the trained skill level, the collaborative data item includes identifying and researching collaboration resources;
  for the novice skill level, the collaborative data item includes actively participating in collaborative forums;
  for the proficient skill level, the collaborative data item includes contributing to collaborative forums or serving as a subject matter expert on projects;
  for the advanced skill level, the collaborative data item includes leading a community of practice and events;
  for the expert skill level, the collaborative data item includes proactively contacting leaders of communities of practice, assisting or speaking to communities of practice, or surveying relevant audiences on the impact of collaborative activities;

transforming, by the processor, the plurality of job experience data items, the plurality of formal learning data items and the plurality of collaborative data items into a roadmap, wherein the roadmap describes the job experience data items, formal learning data items and collaborative data items recommended to reach each skill level identified by each skill level identifier; and providing, via the network interface, to the user device, the skill area identifier, the skill level identifier and the roadmap.

10. The computer-implemented method of claim 9 wherein transforming, by the processor, the plurality of job experience data items, the plurality of formal learning data items and the plurality of collaborative data items into a roadmap, wherein the roadmap describes the job experience data items, formal learning data items and collaborative data items recommended to reach each skill level identified by each skill level identifier further comprises:
  applying, by the processor, the plurality of job experience data items to a job experience framework;
  applying, by the processor, the plurality of formal learning data items to a formal learning framework;
  applying, by the processor, the plurality of collaborative data items to a collaborative framework; and
  transforming, by the processor, the job experience framework, the formal learning framework, and the collaborative framework into a roadmap.

11. The computer-implemented method of claim 10 wherein the job experience framework describes a plurality of vendor products the user within the skill area having the skill level should be exposed to.

12. The computer-implemented method of claim 10 wherein the formal learning framework describes a plurality of recommended learning resources and reference materials.

13. The computer-implemented method of claim 10 wherein the collaborative framework describes a plurality of persons within the skill area the user should network with.

14. The computer-implemented method of claim 9 wherein the skill area identifier, the skill level identifier and the roadmap are provided to the user, via the network interface, through a web page.

15. A system for providing a roadmap for building proficiency in a skill area, the system comprising:
  a memory to store a plurality of job experience data items, a plurality of formal learning data items, and a plurality of collaborative data items associated with a skill area identifier identifying a sill area of a plurality of skill areas within an organization, and a skill level identifier identifying a skill level of a plurality of skill levels within the skill level, wherein at least one job experience data item describes a task which is performed by a user within the skill area having the skill level, at least one formal learning data item describes a learning activity which is performed by the user within the skill area having the skill level, and at least one collaborative data item describes a role in a collaborative forum of a user within the skill area having the skill level;
  wherein the skill levels further include:
    a trained skill level;
    a novice skill level
    a proficient skill level;
    an advanced skill level; and
    an expert skill level;
  a network interface operatively connected to the memory, the network interface operative to communicate with a device of a user;
  a processor operatively connected to the memory and to the network interface, the processor operative to receive, from the device of the user via the network interface, the skill area identifier and the skill level identifier, retrieve the plurality of job experience data items associated with the skill area identifier and the skill level identifier, retrieve the plurality of formal learning data items associated with the skill area identifier and the skill level identifier, retrieve the plurality of collaborative data items associated with the skill area identifier and the skill level identifier, transform the plurality of job experience data items, the plurality of formal learning data items and the plurality of collaborative data items into a roadmap, wherein the roadmap describes the job experience data items, formal learning data items, and collaborative data items recommended to reach the skill level identified by the skill level identifier, and providing, via the network interface to the device of the user, the skill area identifier, the skill level identifier and the roadmap, and wherein
    for the trained skill level, the collaborative data item includes identifying and researching collaboration resources;
    for the novice skill level, the collaborative data item includes actively participating in collaborative forums;

for the proficient skill level, the collaborative data item includes contributing to collaborative forums or serving as a subject matter expert on projects;

for the advanced skill level, the collaborative data item includes leading a community of practice and events;

for the expert skill level, the collaborative data item includes proactively contacting leaders of communities of practice, assisting or speaking to communities of practice, or surveying relevant audiences on the impact of collaborative activities.

16. The system of claim 15 wherein the processor is further operative to apply the plurality of job experience data items to a job experience framework, apply the plurality of formal learning data items to a formal learning framework, apply the plurality of collaborative data items to a collaborative framework, and transform the job experience framework, the formal learning framework, and the collaborative framework into a roadmap.

17. The system of claim 16 wherein the job experience framework describes a plurality of vendor products the user within the skill area having the skill level should be exposed to.

18. The system of claim 16 wherein the formal learning framework describes a plurality of recommended learning resources and reference materials.

19. The system of claim 16 wherein the collaborative framework describes a plurality of persons within the skill area the user should network with.

20. The system of claim 15 wherein the skill area identifier, the skill level identifier and the roadmap are provided to the user through a web page.

* * * * *